(12) United States Patent
Liu et al.

(10) Patent No.: US 10,607,793 B1
(45) Date of Patent: Mar. 31, 2020

(54) KEYBOARD DEVICE

(71) Applicant: Primax Electronics Ltd., Taipei (TW)

(72) Inventors: Chun-Yuan Liu, Taipei (TW);
Che-Wei Yang, Taipei (TW);
Ming-Han Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/263,957

(22) Filed: Jan. 31, 2019

(30) Foreign Application Priority Data

Nov. 30, 2018 (TW) .............................. 107143047 A

(51) Int. Cl.
*H01H 13/7065* (2006.01)
*H01H 13/803* (2006.01)
*G06F 3/02* (2006.01)

(52) U.S. Cl.
CPC ....... *H01H 13/7065* (2013.01); *G06F 3/0202* (2013.01); *H01H 13/803* (2013.01); *H01H 2221/044* (2013.01); *H01H 2223/03* (2013.01); *H01H 2223/042* (2013.01)

(58) Field of Classification Search
CPC ............. H01H 13/7065; H01H 13/803; H01H 2223/03; H01H 2221/044; H01H 2223/042; G06F 3/0202

USPC ................................................ 200/344, 345
See application file for complete search history.

(56) References Cited

U.S. PATENT DOCUMENTS 8,188,387 B2 * 5/2012 Lo .......................... H01H 3/122
200/5 A
9,378,903 B2 * 6/2016 Hsu ........................ H01H 3/122

\* cited by examiner

*Primary Examiner* — Edwin A. Leon
*Assistant Examiner* — Lheiren Mae A Caroc
(74) *Attorney, Agent, or Firm* — Kirton McConkie; Evan R. Witt

(57) ABSTRACT

A keyboard device includes a base plate and a key structure. The key structure includes a keycap, a first connecting element, a second connecting element and a stabilizer bar. The first connecting element and the second connecting element are arranged between the base plate and the keycap and connected with the base plate and the keycap. The stabilizer bar is fixed on the first connecting element and the second connecting element. Since the stabilizer bar does not collide with the base plate to generate the unpleasant noise, the keyboard device of the present invention is capable of reducing the noise. Moreover, since the stabilizer bar is fixed on the first connecting element and the second connecting element, it is not necessary to install hooks corresponding to the stabilizer bar on the keycap and the base plate and the fabricating cost is reduced.

9 Claims, 9 Drawing Sheets

US 10,607,793 B1

KEYBOARD DEVICE

FIELD OF THE INVENTION

The present invention relates to an input device, and more particularly to a keyboard device with plural key structures.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices. The subject of the present invention is related to a keyboard device.

FIG. 1 is a schematic top view illustrating the outer appearance of a conventional keyboard device. As shown in FIG. 1, plural key structures 10 and 10' are disposed on a top surface of the conventional keyboard device 1. The key structures 10 have the ordinary sizes. The key structures 10' are relatively longer. That is, the length of the key structure 10 is slightly larger than the width of the key structure 10, and the length L1 of the key structure 10' is much larger than the width W1 of the key structure 10'. When one of the key structures 10 and 10' is depressed by the user's finger, a corresponding key signal is generated to the computer, and thus the computer executes a function corresponding to the depressed key structure. Generally, the user may depress the key structures 10 and 10' to input corresponding English letters (or symbols) or numbers or execute various functions (e.g., F1-F12 or Delete). For example, the conventional keyboard device 1 is a keyboard for a notebook computer.

The structures of the conventional keyboard device will be illustrated as follows. FIG. 2 is a schematic exploded view illustrating a portion of the conventional keyboard device and taken along a viewpoint. FIG. 3 is a schematic exploded view illustrating a portion of the conventional keyboard device and taken along another viewpoint. Please refer to FIGS. 1, 2 and 3. The conventional keyboard device 1 comprises plural key structures 10 and 10', a metallic base plate 11 and a membrane circuit board 12. The membrane circuit board 12 comprises plural membrane switches 121 corresponding to the plural key structures 10 and 10'. Each of the plural key structures 10 and 10' comprises a keycap 101, at least one scissors-type connecting element 102 and a rubbery elastomer 103. The scissors-type connecting element 102 is connected between the keycap 101 and the metallic base plate 11. Moreover, the scissors-type connecting element 102 comprises a first frame 1021 and a second frame 1022. The second frame 1022 is pivotally coupled to the first frame 1021. Consequently, the first frame 1021 and the second frame 1022 can be swung relative to each other. The rubbery elastomer 103 is arranged between the keycap 101 and the metallic base plate 11. Moreover, the rubbery elastomer 103 comprises a contacting part 1031.

While the keycap 101 of any key structure 10 or 10' is depressed and moved downwardly relative to the metallic base plate 11, the first frame 1021 and the second frame 1022 of the scissors-type connecting element 102 are switched from an open-scissors state to a stacked state. Moreover, as the keycap 101 is moved downwardly to compress the rubbery elastomer 103, the corresponding membrane switch 121 is pushed and triggered by the contacting part 1031 of the rubbery elastomer 103. Consequently, the membrane circuit board 12 generates a corresponding key signal. When the keycap 101 of the key structure 10 or 10' is no longer depressed, the keycap 101 is moved upwardly relative to the metallic base plate 11 in response to an elastic force of the rubbery elastomer 103. Meanwhile, the first frame 1021 and the second frame 1022 are switched from the stacked state to the open-scissors state again, and the keycap 101 is returned to its original position.

In the keyboard device 1, the key structures 10' and the key structures 10 are distinguished. As shown in the drawings, the length L1 of the key structure 10' is much larger than the width W1 of the key structure 10'. Since the length L1 of the keycap 101 of the key structure 10' is relatively longer, the keycap 101 is readily rocked while the key structure 10' is depressed. That is, the operating smoothness of the key structure 10' is adversely affected, and even the tactile feel of the user is impaired. For increasing the operating smoothness of the key structure 10', the key structure 10' is further equipped with a special mechanism. For example, the key structure 10' further comprises a first stabilizer bar 104 and a second stabilizer bar 105. The first stabilizer bar 104 comprises a first linking bar part 1041 and two first hook parts 1042. The two first hook parts 1042 are located at two ends of the first stabilizer bar 104, respectively. The second stabilizer bar 105 comprises a second linking bar part 1051 and two second hook parts 1052. The two second hook parts 1052 are located at two ends of the second stabilizer bar 105, respectively.

The metallic base plate 11 comprises a first connecting structure 111 and a second connecting structure 112. The first connecting structure 111 and the second connecting structure 112 are protruded upwardly, and penetrated through the membrane circuit board 12. The first connecting structure 111 comprises a first locking hole 1111 and a third locking hole 1112. The second connecting structure 112 comprises a second locking hole 1121 and a fourth locking hole 1122. The second locking hole 1121 corresponds to the first locking hole 1111, and the fourth locking hole 1122 corresponds to the third locking hole 1112.

The first linking bar part 1041 of the first stabilizer bar 104 and the second linking bar part 1051 of the second stabilizer bar 105 are pivotally coupled to the keycap 101 of the key structure 10'. The two first hook parts 1042 of the first stabilizer bar 104 are penetrated through the first locking hole 1111 of the first connecting structure 111 and the second locking hole 1121 of the second connecting structure 112, respectively. The two second hook parts 1052 of the second stabilizer bar 105 are penetrated through the third locking hole 1112 of the first connecting structure 111 and the fourth locking hole 1122 of the second connecting structure 112, respectively.

FIG. 4 is a schematic perspective view illustrating a portion of the combination of the metallic base plate and the membrane circuit board of the conventional keyboard device. FIG. 5 schematically illustrates the actions of the first stabilizer bar and the second stabilizer bar of the conventional keyboard device. Please refer to FIGS. 4 and 5. While the keycap 101 of the key structure 10' is moved upwardly or downwardly relative to the metallic base plate 11, the first stabilizer bar 104 is moved in a first direction D11 or a second direction D12 and rotated in a first rotating direction D13 or a second rotating direction D14. Similarly, the second stabilizer bar 105 is moved in the first direction D11 or the second direction D12 and rotated in the first rotating direction D13 or the second rotating direction D14. By the first stabilizer bar 104 and the second stabilizer bar 105, the key structure 10' is kept stable and not inclined while the key structure 10' is moved upwardly or downwardly relative to the metallic base plate 11. Moreover, the uses of the first stabilizer bar 104 and the second stabilizer bar 105 are helpful to increase the strength of the keycap 101.

However, the conventional keyboard device 1 still has some drawbacks. For example, all of the first stabilizer bar 104, the second stabilizer bar 105 and the metallic base plate 11 are made of metallic material. Please refer to FIGS. 4 and 5. While the keycap 101 of the key structure 10' is moved upwardly or downwardly relative to the metallic base plate 11 and the first stabilizer bar 104 and the second stabilizer bar 105 are correspondingly moved and rotated, the two first hook parts 1042 of the first stabilizer bar 104 and the two second hook parts 1052 of the second stabilizer bar 105 are readily contacted with the metallic base plate 11. While the two first hook parts 1042 and the two second hook parts 1052 collide with the metallic base plate 11, a click sound is generated. Especially when the R corners of the two first hook parts 1042 and the two second hook parts 1052 (e.g., the regions indicated by oblique lines of FIG. 5) collide with the metallic base plate 11, the click sound is generated. This sound is unpleasant noise to the user.

Therefore, there is a need of providing a keyboard device with reduced noise.

SUMMARY OF THE INVENTION

An object of the present invention provides a keyboard device with reduced noise.

An object of the present invention provides a keyboard device with small-sized key structures.

In accordance with an aspect of the present invention, there is provided a keyboard device. The keyboard device includes a base plate and a key structure. The key structure is located over the base plate. The key structure includes a keycap, a first connecting element, a second connecting element and a stabilizer bar. The keycap is located over the base plate and partially exposed outside the keyboard device. The first connecting element is arranged between the base plate and the keycap, and connected with the base plate and the keycap. The first connecting element is permitted to be swung relative to the base plate. The second connecting element is arranged between the base plate and the keycap, located beside the first connecting element, and connected with the base plate and the keycap. The second connecting element is permitted to be swung relative to the base plate. The stabilizer bar is arranged between the base plate and the keycap, and fixed on the first connecting element and the second connecting element. The stabilizer bar includes a linking bar part, a first hook part and a second hook part. The linking bar part is contacted with the first connecting element and the second connecting element, and the linking bar part is limited by the first connecting element and the second connecting element. Consequently, the linking bar part is only permitted to be rotated and slid relative to the base plate. The first hook part is located at a first end of the linking bar part, inserted into the first connecting element and rotatable and slidable relative to the first connecting element. The second hook part is located at a second end of the linking bar part, inserted into the second connecting element and rotatable and slidable relative to the second connecting element.

In an embodiment, the first connecting element includes a first coupling part, a second coupling part, a first position-limiting post and a first receiving recess. The first coupling part is located at a first end of the first connecting element, and connected with the keycap. The second coupling part is located at a second end of the first connecting element, and connected with the base plate. The first position-limiting post is disposed on a first sidewall of the first connecting element and protruded from the first sidewall. The first position-limiting post is contacted with the linking bar part. Consequently, the linking bar part is only permitted to be rotated and slid in a region under the second position-limiting post. The first receiving recess is located at the first end of the first connecting element, and located near the first coupling part. The first hook part is received within the first receiving recess. A depth of the first receiving recess is equal to a diameter of the first hook part.

In an embodiment, the second connecting element includes a third coupling part, a fourth coupling part, a second position-limiting post and a second receiving recess. The third coupling part is located at a first end of the second connecting element, and connected with the keycap. The fourth coupling part is located at a second end of the second connecting element, and connected with the base plate. The second position-limiting post is disposed on a second sidewall of the second connecting element and protruded from the second sidewall. The second position-limiting post is contacted with the linking bar part. Consequently, the linking bar part is only permitted to be rotated and slid in a region under the first position-limiting post. The second receiving recess is located at the first end of the second connecting element, and located near the third coupling part. The second hook part is received within the second receiving recess. A depth of the second receiving recess is equal to a diameter of the second hook part.

As previously described, the stabilizer bar of the conventional keyboard device is fixed on the base plate and the keycap. According to the present invention, the stabilizer bar is arranged between the base plate and the keycap, and fixed on the first connecting element and the second connecting element. Since the stabilizer bar does not collide with the base plate to generate the unpleasant noise, the keyboard device of the present invention is capable of reducing the noise. Moreover, since the stabilizer bar is fixed on the first connecting element and the second connecting element, it is not necessary to install hooks corresponding to the stabilizer bar on the keycap and the base plate and the fabricating cost is reduced. Moreover, since the hooks corresponding to the stabilizer bar are not installed on the keycap and the base plate, the size of the key structure can be reduced. Consequently, the small-sized key structure is suitably applied to the keyboard device of the present invention. For example, the width of the keycap of the small-sized key structure is smaller than 6 mm. Moreover, since the keyboard device of the present invention is not equipped with the conventional scissors-type connecting element, the process of assembling the keyboard device is simplified and the assembling cost of the keyboard device is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides a keyboard device. First of all, the structure of the keyboard device will be illustrated as follows.

Figure 1:
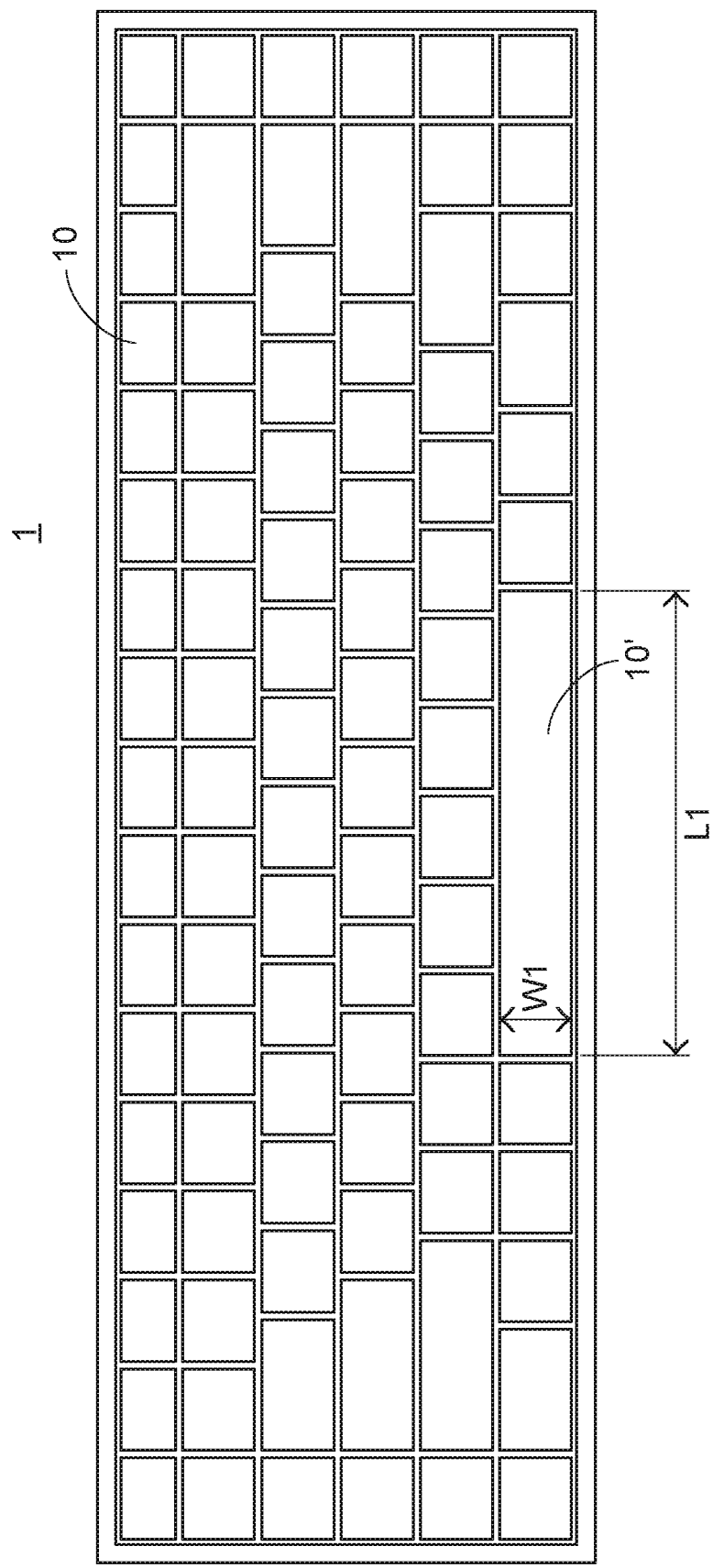
FIG. 1 is a schematic top view illustrating the outer appearance of a conventional keyboard device.
Figure 2:
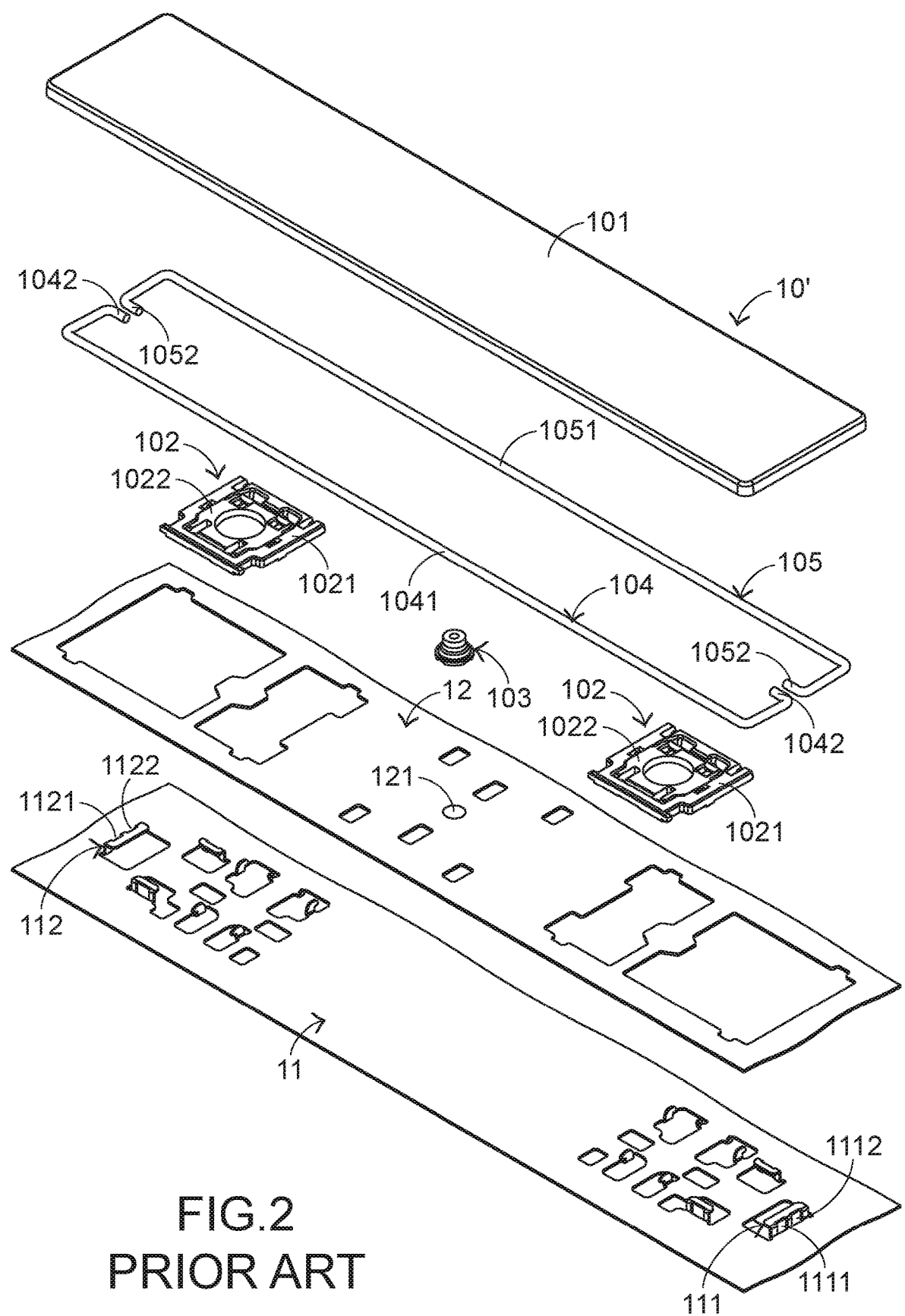
FIG. 2 is a schematic exploded view illustrating a portion of the conventional keyboard device and taken along a viewpoint.
Figure 3:
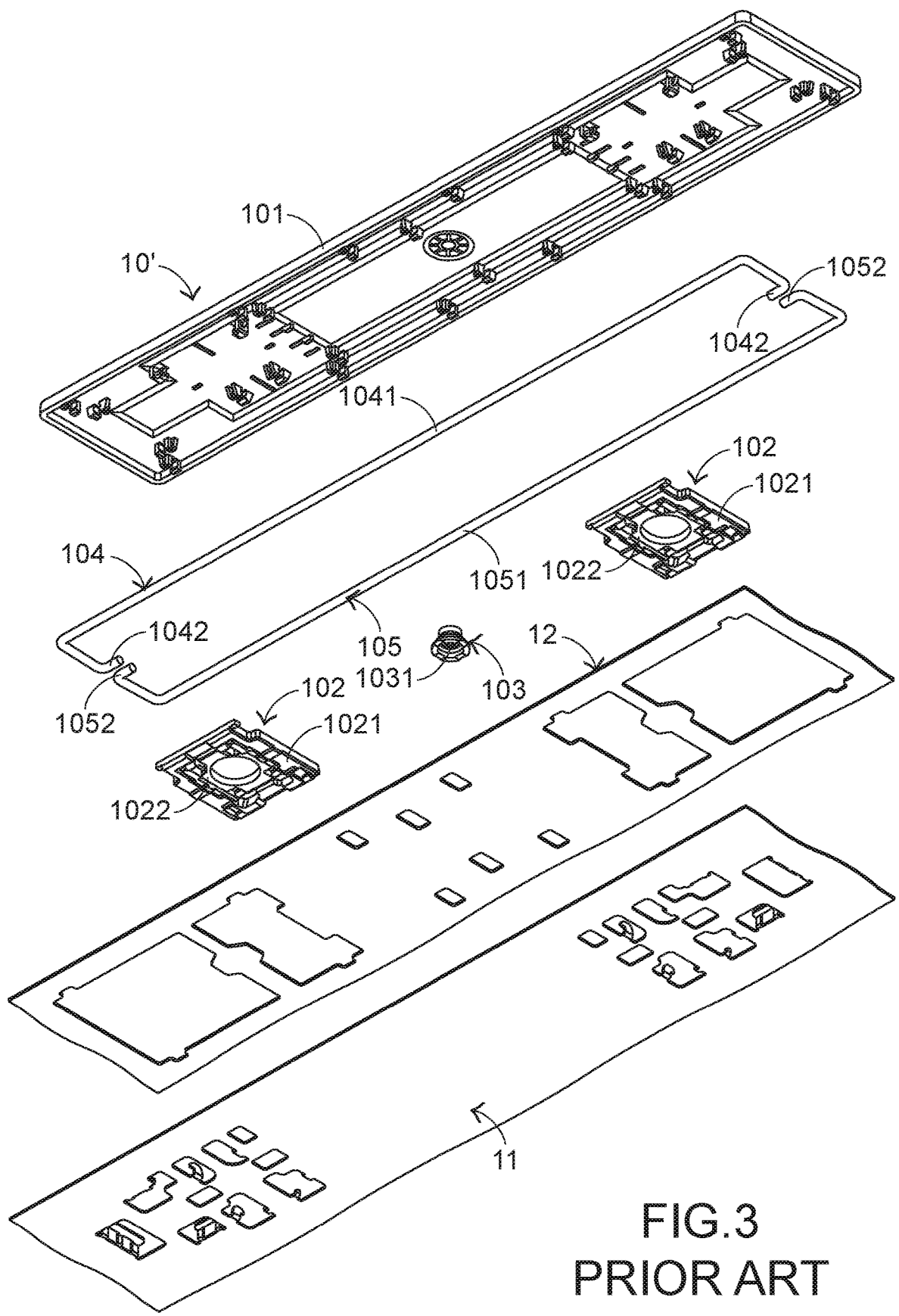
FIG. 3 is a schematic exploded view illustrating a portion of the conventional keyboard device and taken along another viewpoint.
Figure 4:
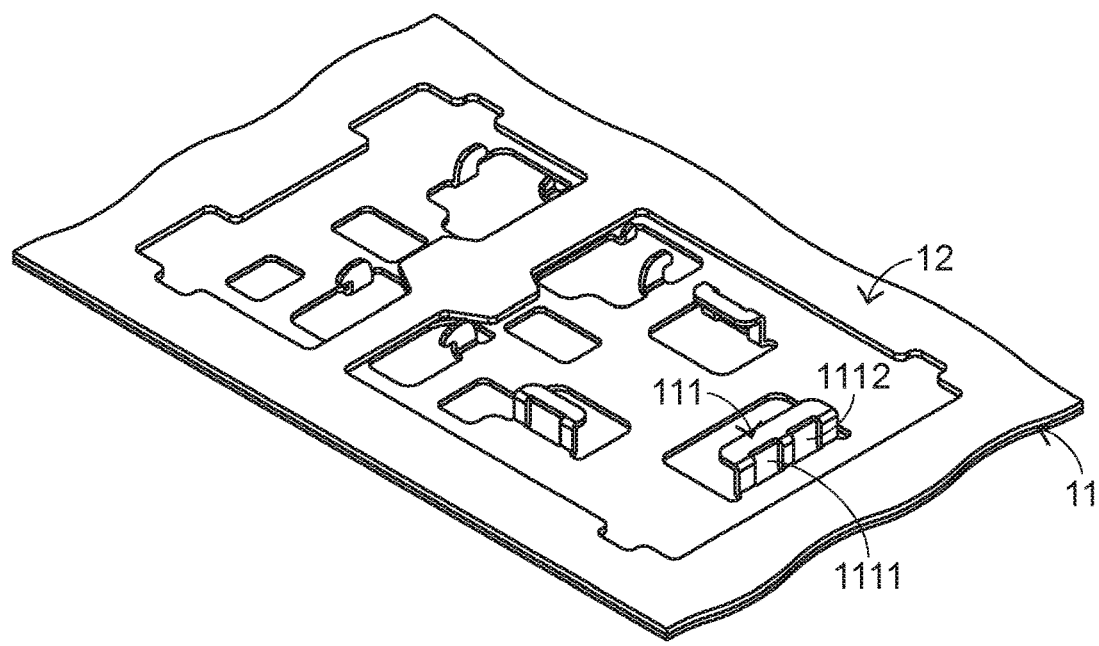
FIG. 4 is a schematic perspective view illustrating a portion of the combination of the metallic base plate and the membrane circuit board of the conventional keyboard device.
Figure 5:
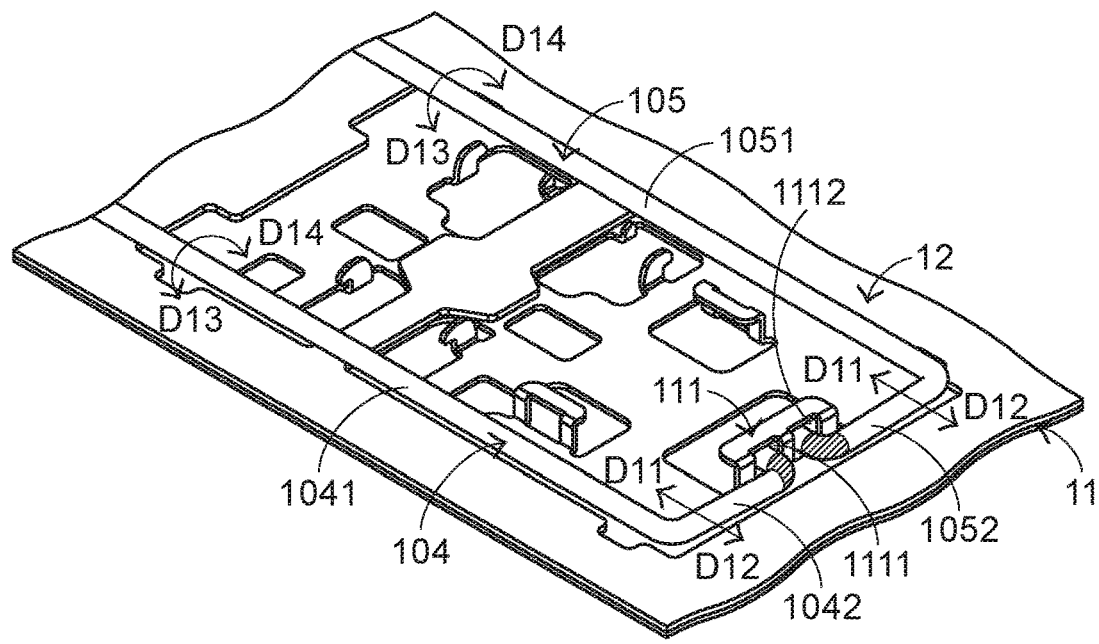
FIG. 5 schematically illustrates the actions of the first stabilizer bar and the second stabilizer bar of the conventional keyboard device.
Figure 6:
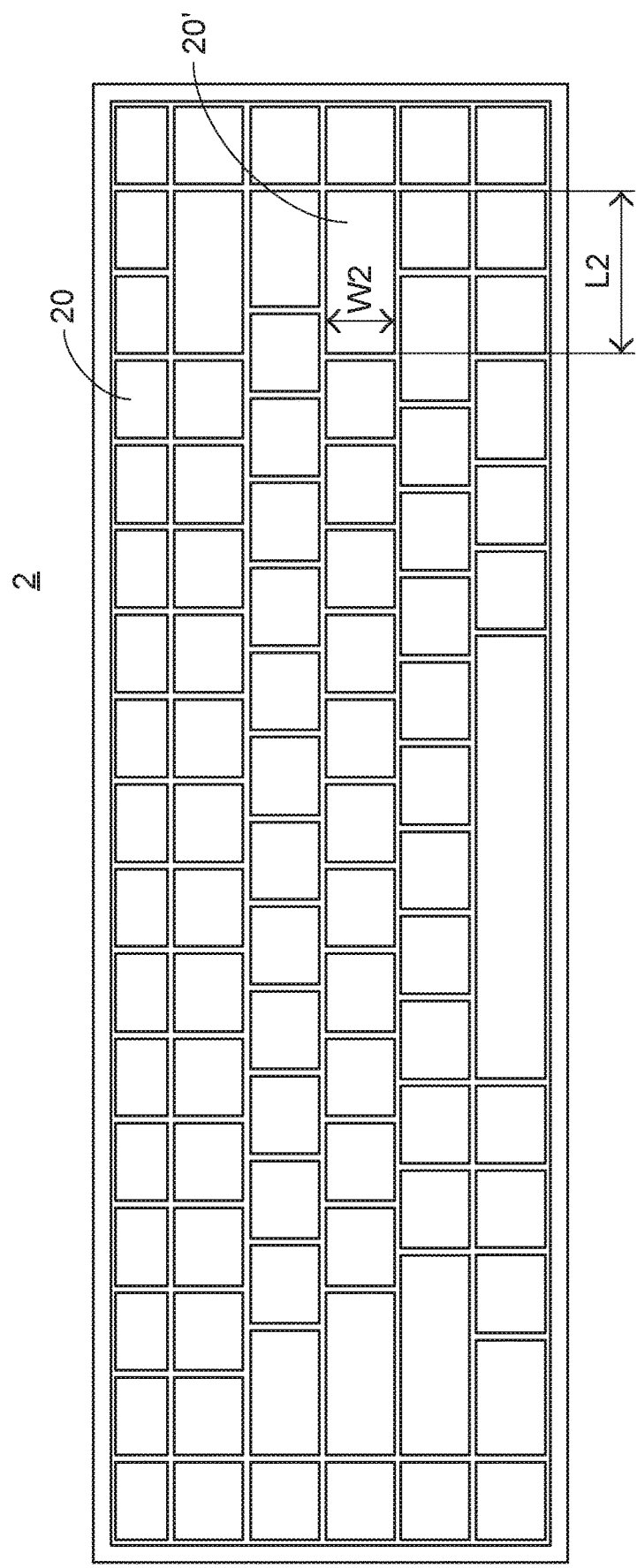
FIG. 6 is a schematic top view illustrating the outer appearance of a keyboard device according to an embodiment of the present invention.

FIG. 6 is a schematic top view illustrating the outer appearance of a keyboard device according to an embodiment of the present invention. The keyboard device 2 comprises plural key structures 20 and 20'. These key structures 20 and 20' are exposed outside the keyboard device 2. When one of the key structures 20 and 20' is depressed by the user's finger, a corresponding key signal is generated to a computer (not shown) that is in communication with the keyboard device 2. Consequently, the computer executes a function corresponding to the depressed key structure. The length of the key structure 20 is slightly larger than the width of the key structure 20. The length L2 of the key structure 20' is much larger than the width W2 of the key structure 20'.

Figure 7:
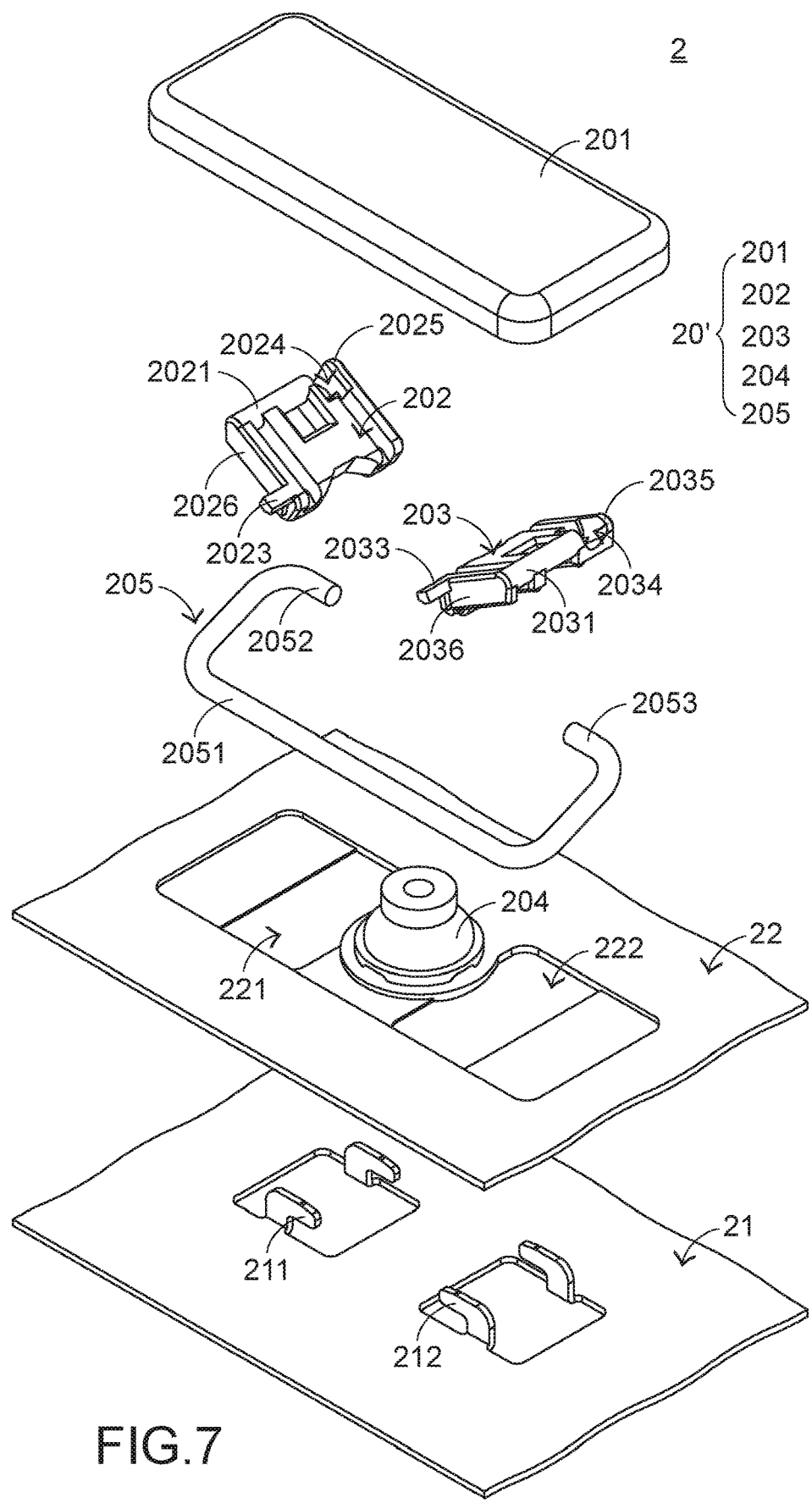
FIG. 7 is a schematic exploded view illustrating a portion of the keyboard device according to the embodiment of the present invention and taken along a viewpoint.

Hereinafter, the inner structure of the keyboard device 2 will be illustrated with reference to FIGS. 7 and 8. FIG. 7 is a schematic exploded view illustrating a portion of the keyboard device according to the embodiment of the present invention and taken along a viewpoint. In addition to the plural key structures 20 and 20', the keyboard device 2 further comprises a base plate 21 and a switch circuit board 22. The base plate 21 is located under the plural key structures 20 and 20' and connected with the plural key structures 20 and 20'.

The base plate 21 comprises plural first base hooks 211 and plural second base hooks 212. As shown in FIG. 7, two first base hooks 211 and two second base hooks 212 are aligned with one key structure 20'. The plural first base hooks 211 and the plural second base hooks 212 are protruded upwardly from the base plate 21 so as to be connected with the corresponding key structure 20'.

The switch circuit board 22 is arranged between the plural key structures 20, 20' and the base plate 21. When the switch circuit board 22 is triggered by one of the plural key structures 20 and 20', a corresponding key signal is generated. The switch circuit board 22 comprises a first opening 221 and a second opening 222. The functions of the first opening 221 and the second opening 222 will be described later. In this embodiment, the base plate 21 is made of a metallic material, and the switch circuit board 22 is a membrane switch circuit board.

Figure 8:
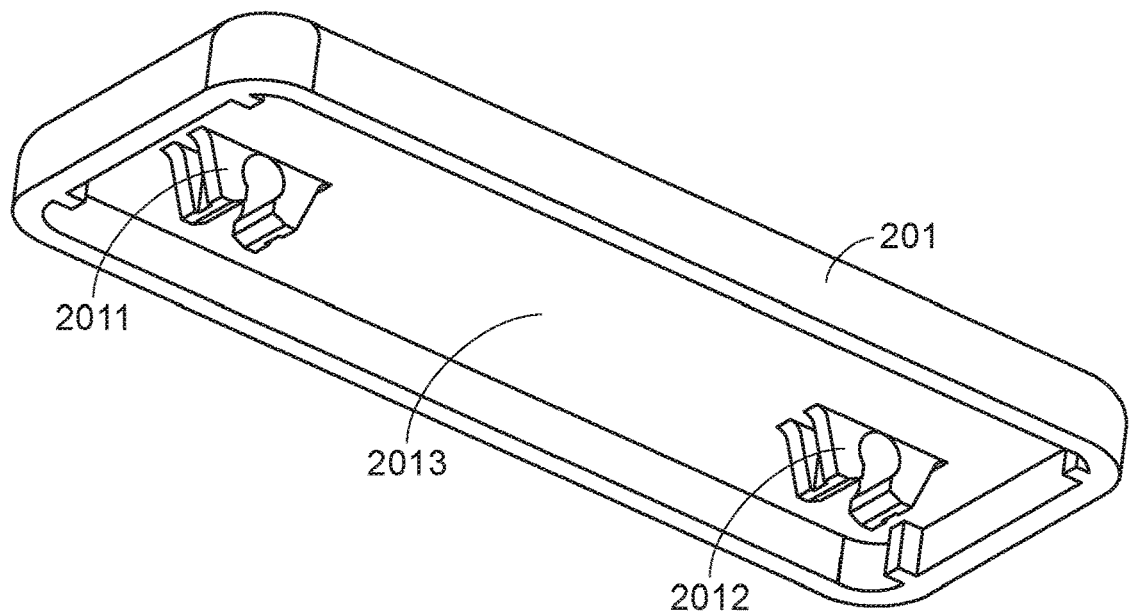
FIG. 8 is a schematic perspective view illustrating the keycap of the keyboard device according to the embodiment of the present invention and taken along another viewpoint.

FIG. 8 is a schematic perspective view illustrating the keycap of the keyboard device according to the embodiment of the present invention and taken along another viewpoint. Please refer to FIGS. 7 and 8. Each of the key structures 20' comprises a keycap 201, a first connecting element 202, a second connecting element 203, an elastic element 204 and a stabilizer bar 205. The keycap 201 is located over the base plate 21 and exposed outside the keyboard device 2. The keycap 201 comprises a first keycap hook 2011 and a second keycap hook 2012. The first keycap hook 2011 is aligned with the first connecting element 202. Moreover, the first keycap hook 2011 is protruded from an inner surface 2013 of the keycap 201 and connected with the first connecting element 202. The second keycap hook 2012 is located beside the first keycap hook 2011 and aligned with the second connecting element 203. The second keycap hook 2012 is also protruded from the inner surface 2013 of the keycap 201. Moreover, the second keycap hook 2012 is connected with the second connecting element 203. The first connecting element 202 is arranged between the base plate 21 and the keycap 201 and can be swung relative to the base plate 21. The first connecting element 202 is connected with the base plate 21 and the keycap 201. The second connecting element 203 is arranged between the base plate 21 and the keycap 201 and located beside the first connecting element 202. The second connecting element 203 can be swung relative to the base plate 21. The second connecting element 203 is connected with the base plate 21 and the keycap 201.

The elastic element 204 is arranged between the keycap 201 and the switch circuit board 22. As the keycap 201 is moved downwardly to compress the elastic element 204, the switch circuit board 22 is pushed by the elastic element 204. Consequently, the switch circuit board 22 is triggered.

The stabilizer bar 205 is arranged between the base plate 21 and the keycap 201 and fixed on the first connecting element 202 and the second connecting element 203. In an embodiment, the stabilizer bar 205 comprises a linking bar part 2051, a first hook part 2052 and a second hook part 2053. The linking bar part 2051 is contacted with the first connecting element 202 and the second connecting element 203. Since the linking bar part 2051 is stopped by the first connecting element 202 and the second connecting element 203, the linking bar part 2051 cannot be swung relative to the base plate 21. That is, since the linking bar part 2051 is limited by the first connecting element 202 and the second connecting element 203, the linking bar part 2051 is permitted to be rotated and slid relative to the base plate 21. The first hook part 2052 is located at a first end of the linking bar part 2051. The first hook part 2052 is inserted into the first connecting element 202 and rotatable and slidable relative to the first connecting element 202. The second hook part 2053 is located at a second end of the linking bar part 2051. The second hook part 2053 is inserted into the second connecting element 203 and rotatable and slidable relative to the second connecting element 203.

In this embodiment, the linking bar part 2051, the first hook part 2052 and the second hook part 2053 are integrally formed as a one-piece structure and made of a metallic material. An example of the elastic element 204 is a rubbery elastomer. Alternatively, the elastic element is a metallic resilience piece or a metal dome.

Please refer to FIG. 7 again. The first opening 221 of the switch circuit board 22 is aligned with the first connecting element 202 and located under the first connecting element 202. A portion of the base plate 21 is penetrated through the first opening 221 and connected with the first connecting element 202. The second opening 222 of the switch circuit board 22 is aligned with the second connecting element 203 and located under the second connecting element 203. A portion of the base plate 21 is penetrated through the second opening 222 and connected with the second connecting element 203. As mentioned above, the base plate 21 comprises the first base hook 211 and the second base hook 212. The first base hook 211 is aligned with the first connecting element 202. Moreover, the first base hook 211 is protruded from the base plate 21 and penetrated through the first opening 221. Consequently, the first base hook 211 is connected with the first connecting element 202. The second base hook 212 is aligned with the second connecting element 203. The second base hook 212 is protruded from the base plate 21 and penetrated through the second opening 222. Consequently, the second base hook 212 is connected with the second connecting element 203.

Figure 9:
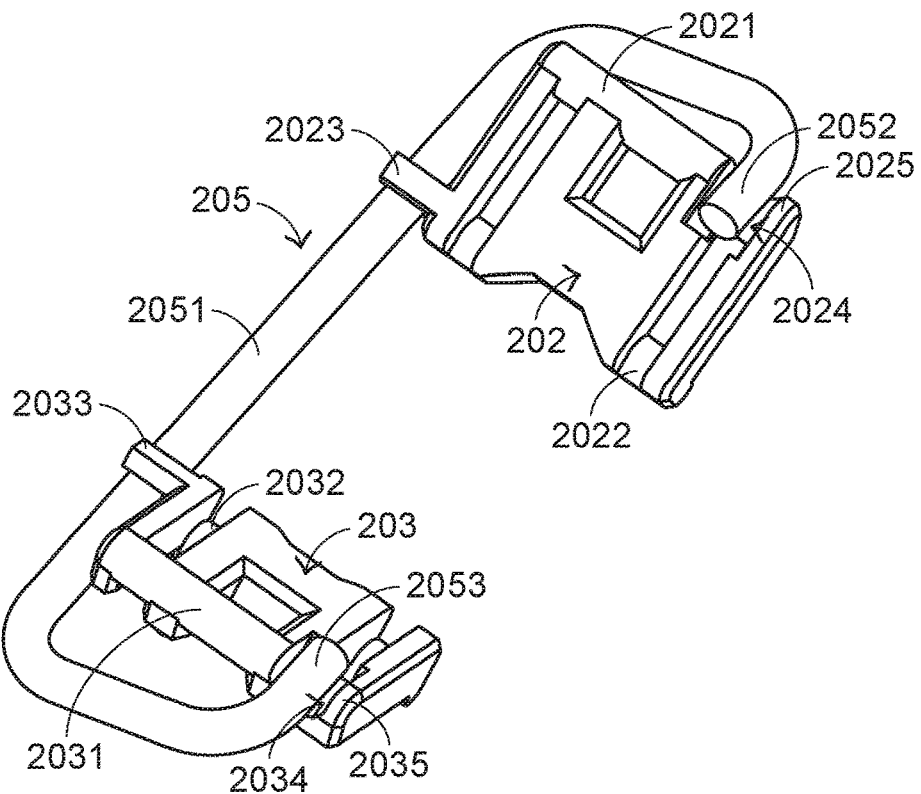
FIG. 9 is schematic perspective view illustrating the first connecting element, the second connecting element and the stabilizer bar of the keyboard device according to the embodiment of the present invention and taken along another viewpoint.

The detailed structure of the first connecting element 202 will be described as follows. FIG. 9 is schematic perspective view illustrating the first connecting element, the second connecting element and the stabilizer bar of the keyboard device according to the embodiment of the present invention and taken along another viewpoint. Please refer to FIGS. 7, 8 and 9. The first connecting element 202 comprises a first coupling part 2021, a second coupling part 2022, a first position-limiting post 2023, a first receiving recess 2024 and a first fillet structure 2025. The first coupling part 2021 is located at a first end of the first connecting element 202. Moreover, the first coupling part 2021 is connected with the first keycap hook 2011 of the keycap 201. The second coupling part 2022 is located at a second end of the first connecting element 202. Moreover, the second coupling part 2022 is connected with the first base hook 211 of the base plate 21. The first position-limiting post 2023 is disposed on a first sidewall 2026 of the first connecting element 202 and protruded from the first sidewall 2026. The first position-limiting post 2023 is contacted with the linking bar part 2051. Consequently, the linking bar part 2051 is only permitted to be rotated and slid in the region under the first position-limiting post 2023. The first receiving recess 2024 is located at the first end of the first connecting element 202 and located near the first coupling part 2021. The first receiving recess 2024 is used for receiving the first hook part 2052. The first fillet structure 2025 is located beside the first receiving recess 2024. The first fillet structure 2025 is contacted with the inner surface 2013 of the keycap 201. The first fillet structure 2025 can assist the swinging action of the first connecting element 202 relative to the keycap 201. In an embodiment, the first connecting element 202 is made of a plastic material.

The detailed structure of the second connecting element 203 will be described as follows. Please refer to FIGS. 7, 8 and 9. The second connecting element 203 comprises a third coupling part 2031, a fourth coupling part 2032, a second position-limiting post 2033, a second receiving recess 2034 and a second fillet structure 2035. The third coupling part 2031 is located at a first end of the second connecting element 203. Moreover, the third coupling part 2031 is connected with the second keycap hook 2012 of the keycap 201. The fourth coupling part 2032 is located at a second end of the second connecting element 203. The fourth coupling part 2032 is connected with the second base hook 212 of the base plate 21. The second position-limiting post 2033 is disposed on a second sidewall 2036 of the second connecting element 203 and protruded from the second sidewall 2036. The second position-limiting post 2033 is contacted with the linking bar part 2051. Consequently, the linking bar part 2051 is only permitted to be rotated and slid in the region under the second position-limiting post 2033. The second receiving recess 2034 is located at the first end of the second connecting element 203 and located near the third coupling part 2031. The second receiving recess 2034 is used for receiving the second hook part 2053. The second fillet structure 2035 is located beside the second receiving recess 2034. The second fillet structure 2035 is contacted with the inner surface 2013 of the keycap 201. The second fillet structure 2035 can assist in the swinging action of the second connecting element 203 relative to the keycap 201. In an embodiment, the second connecting element 203 is made of a plastic material.

Figure 10:
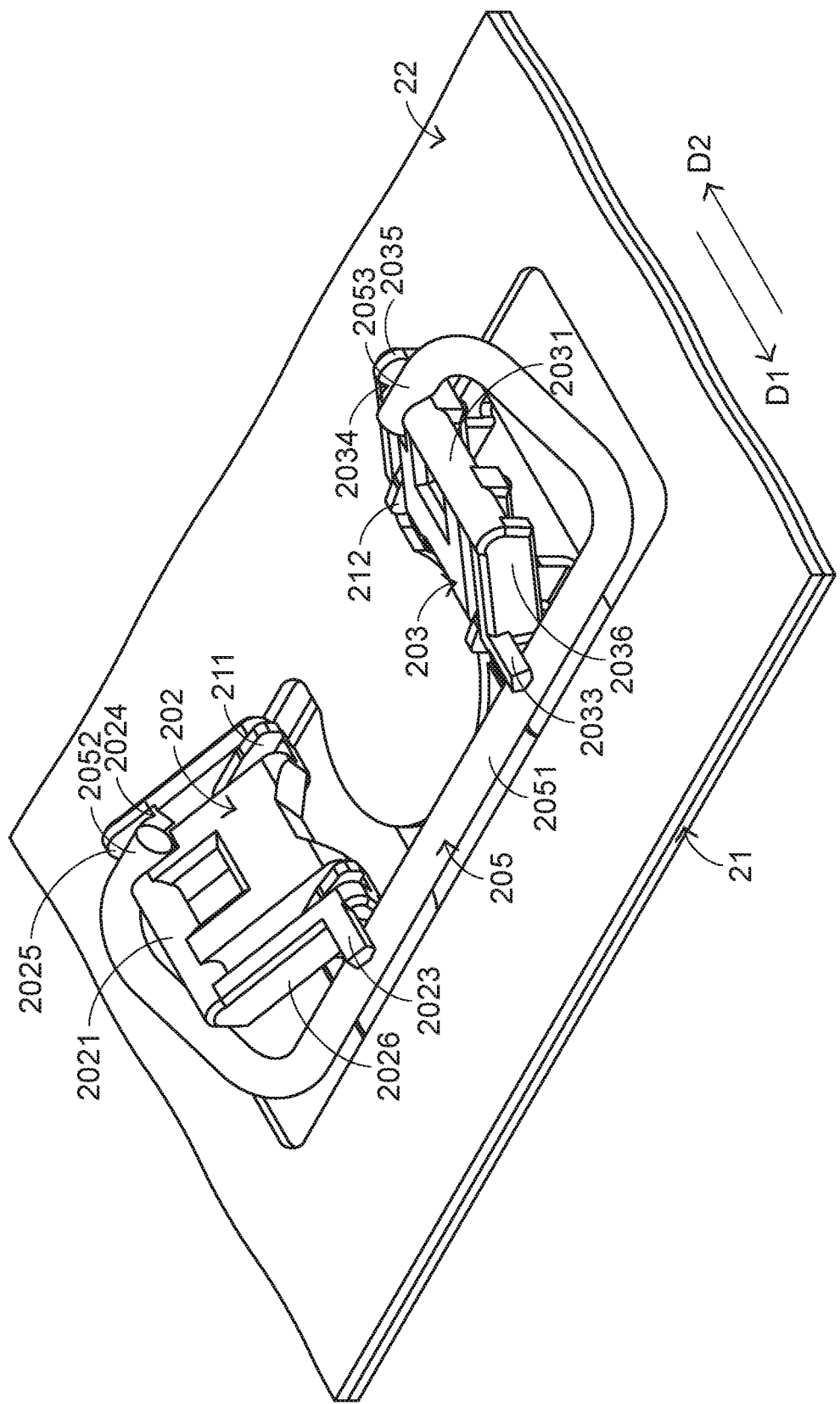
FIG. 10 is a schematic perspective view illustrating a portion of the keyboard device according to the embodiment of the present invention, in which the keycap is not depressed.
Figure 11:
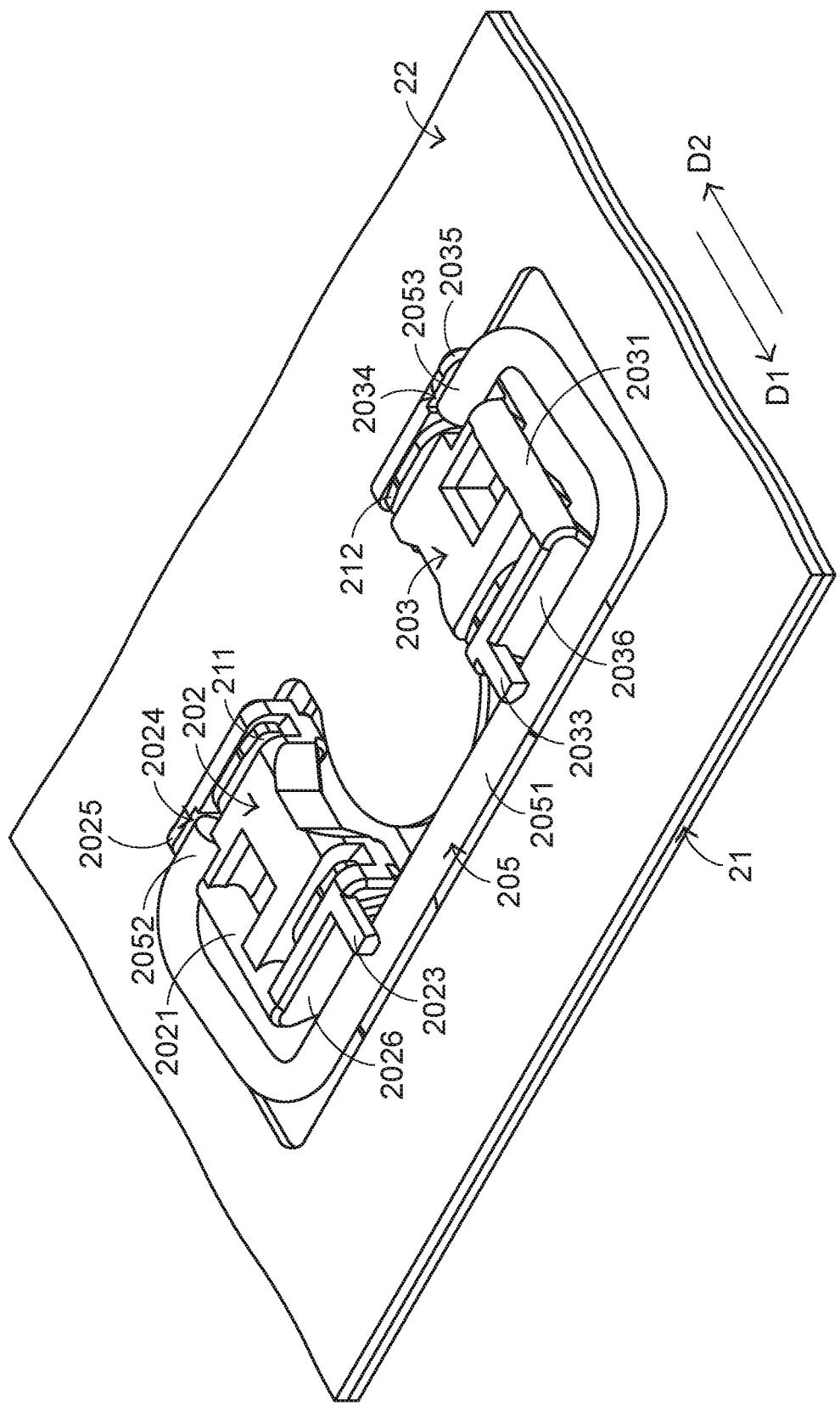
FIG. 11 is a schematic perspective view illustrating a portion of the keyboard device according to the embodiment of the present invention, in which the keycap is depressed.

The operations of depressing the key structure 20' will be described as follows. FIG. 10 is a schematic perspective view illustrating a portion of the keyboard device according to the embodiment of the present invention, in which the keycap is not depressed. FIG. 11 is a schematic perspective view illustrating a portion of the keyboard device according to the embodiment of the present invention, in which the keycap is depressed. Please refer to FIGS. 7, 9, 10 and 11.

While the keycap 201 of any key structure 20' is depressed, the keycap 201 is moved downwardly relative to the base plate 21 in response to an external force. Since the first connecting element 202 and the second connecting element 203 are pushed by the keycap 201, the first connecting element 202 and the second connecting element 203 are correspondingly swung. That is, the first connecting element 202 is swung around the first coupling part 2021 (i.e., by using the first coupling part 2021 as a rotating shaft) and swung relative to the keycap 201, and the first connecting element 202 is swung around the second coupling part 2022 (i.e., by using the second coupling part 2022 as a rotating shaft) and swung relative to the base plate 21. Similarly, the second connecting element 203 is swung around the third coupling part 2031 (i.e., by using the third coupling part 2031 as a rotating shaft) and swung relative to the keycap 201, and the second connecting element 203 is swung around the fourth coupling part 2032 (i.e., by using the fourth coupling part 2032 as a rotating shaft) and swung relative to the base plate 21. While the first connecting element 202 and the second connecting element 203 are swung, the stabilizer bar 205 is correspondingly swung with the first connecting element 202 and the second connecting element 203. While the stabilizer bar 205 is swung, the first hook part 2052 is rotated within the first receiving recess 2024 and slid in a first direction D1. Similarly, the second hook part 2053 is rotated within the second receiving recess 2034 and slid in the first direction D1. In addition, the linking bar part 2051 is rotated, and slid along the first position-limiting post 2023 and the second position-limiting post 2033 in a second direction D2. Consequently, the keycap 201 is moved downward lay relative to the base plate 21.

Moreover, as the keycap 201 is moved downwardly to push the elastic element 204, the elastic element 204 is subjected to deformation to trigger the switch circuit board 22. Consequently, the switch circuit board 22 generates the corresponding key signal. As shown in FIG. 10, the keyboard device 2 is in the depressed state.

When the key structure 20' is no longer depressed, the keycap 201 is moved upwardly relative to the base plate 21 in response to a restoring elastic force of the elastic element 204. As the keycap 201 is moved upwardly, the first connecting element 202 and the second connecting element 203 are correspondingly swung and the stabilizer bar 205 is swung with the first connecting element 202 and the second connecting element 203. Consequently, the first hook part 2052 is rotated within the first receiving recess 2024 and slid in the second direction D2, and the second hook part 2053 is rotated within the second receiving recess 2034 and slid in the second direction D2. In addition, the linking bar part 2051 is rotated, and slid along the first position-limiting post 2023 and the second position-limiting post 2033 in the first direction D1. In such way, the keycap 201 is moved upwardly relative to the base plate 21 and returned to its original position.

As mentioned above, while the keycap 201 of the key structure 20' is moved upwardly or downwardly relative to the base plate 21, the first hook part 2052 and the second hook part 2053 are rotated and slid within the first receiving recess 2024 and the second receiving recess 2034, respectively. The linking bar part 2051 is contacted with the switch circuit board 22, the first position-limiting post 2023 and the second position-limiting post 2033 only. Since the stabilizer bar 205 does not collide with the base plate 21 to generate the unpleasant noise, the keyboard device 2 of the present invention is capable of reducing the noise.

The following two aspects should be specially described. Firstly, the sizes of the first connecting element 202 and the second connecting element 203 are designed according to precise calculation. Because of this design, the sliding action of the first hook part 2052 within the first receiving recess 2024 does not hinder the swinging action of the first connecting element 202. In this embodiment, the depth of the first receiving recess 2024 is equal to the diameter of the first hook part 2052, the width of the first receiving recess 2024 is larger than the diameter of the first hook part 2052, the depth of the second receiving recess 2034 is equal to the diameter of the second hook part 2053, and the width of the second receiving recess 2034 is larger than the diameter of the second hook part 2053. It is noted that numerous modifications and alterations may be made while retaining the teachings of the invention. In another embodiment, the depth of the first receiving recess is slightly larger than the diameter of the first hook part, and the depth of the second receiving recess is slightly larger than the diameter of the second hook part.

Secondly, the first fillet structure 2025 of the first connecting element 202 and the second fillet structure 2035 of the second connecting element 203 can assist in the swinging actions of the first connecting element 202 and the second connecting element 203 relative to the keycap 201. In such way, the first connecting element 202 and the second connecting element 203 are swung more smoothly, and the tactile feel of operating the keycap 201 is not adversely affected.

As previously described, the stabilizer bar of the conventional keyboard device is fixed on the base plate and the keycap. According to the present invention, the stabilizer bar is arranged between the base plate and the keycap, and fixed on the first connecting element and the second connecting element. Since the stabilizer bar does not collide with the base plate to generate the unpleasant noise, the keyboard device of the present invention is capable of reducing the noise. Moreover, since the stabilizer bar is fixed on the first connecting element and the second connecting element, it is not necessary to install hooks corresponding to the stabilizer bar on the keycap and the base plate and the fabricating cost is reduced. Moreover, since the hooks corresponding to the stabilizer bar are not installed on the keycap and the base plate, the size of the key structure can be reduced. Consequently, the small-sized key structure is suitably applied to the keyboard device of the present invention. For example, the width of the keycap of the small-sized key structure is smaller than 6 mm. Moreover, since the keyboard device of the present invention is not equipped with the conventional scissors-type connecting element, the process of assembling the keyboard device is simplified and the assembling cost of the keyboard device is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
   a base plate; and
   a key structure located over the base plate, and comprising:
   a keycap located over the base plate and partially exposed outside the keyboard device;
   a first connecting element arranged between the base plate and the keycap, and connected with the base plate and the keycap, wherein the first connecting element is permitted to be swung relative to the base plate, wherein the first connecting element comprises:
   a first coupling part located at a first end of the first connecting element, and connected with the keycap;
   a second coupling part located at a second end of the first connecting element, and connected with the base plate;
   a first position-limiting post disposed on a first sidewall of the first connecting element and protruded from the first sidewall; and
   a first receiving recess located at the first end of the first connecting element, and located near the first coupling part;
   a second connecting element arranged between the base plate and the keycap, located beside the first connecting element, and connected with the base plate and the keycap, wherein the second connecting element is permitted to be swung relative to the base plate; and
   a stabilizer bar arranged between the base plate and the keycap, and fixed on the first connecting element and the second connecting element, wherein the stabilizer bar comprises a linking bar part, a first hook part and a second hook part, wherein the linking bar part is contacted with the first connecting element and the second connecting element, and the linking bar part is limited by the first connecting element and the second connecting element, so that the linking bar part is only permitted to be rotated and slid relative to the base plate, wherein the first position-limiting post is contacted with the linking bar part, so that the linking bar part is only permitted to be rotated and slid in a region under the first position-liming post, wherein the first hook part is located at a first end of the linking bar part, wherein the first hook part is received within the first receiving recess, inserted into the first connecting element and rotatable and slidable relative to the first connecting element, wherein the second hook part is located at a second end of the linking bar part, inserted into the second connecting element and rotatable and slidable relative to the second connecting element.

2. The keyboard device according to claim 1, wherein while the keycap is depressed, the first connecting element is swung around the first coupling part and relative to the keycap, the first connecting element is swung around the second coupling part and relative to the base plate, the first hook part is rotated and slid within the first receiving recess, and the linking bar part is slid and rotated along the first position-limiting post, so that the keycap is moved relative to the base plate.

3. The keyboard device according to claim 1, wherein the first connecting element further comprises a first fillet structure, wherein the first connecting element is located beside the first receiving recess and contacted with an inner surface of the keycap to assist in a swinging action of the first connecting element relative to the keycap.

4. The keyboard device according to claim 1, wherein the second connecting element comprises:
   a third coupling part located at a first end of the second connecting element, and connected with the keycap;
   a fourth coupling part located at a second end of the second connecting element, and connected with the base plate;
   a second position-limiting post disposed on a second sidewall of the second connecting element and protruded from the second sidewall, wherein the second position-limiting post is contacted with the linking bar part, so that the linking bar part is only permitted to be rotated and slid in a region under the second position-limiting; and
   a second receiving recess located at the first end of the second connecting element, and located near the third coupling part, wherein the second hook part is received within the second receiving recess.

5. The keyboard device according to claim 4, wherein while the keycap is depressed, the second connecting element is swung around the third coupling part and relative to the keycap, the second connecting element is swung around the fourth coupling part and relative to the base plate, the second hook part is rotated and slid within the second receiving recess, and the linking bar part is slid and rotated along the second position-limiting post, so that the keycap is moved relative to the base plate.

6. The keyboard device according to claim 1, wherein the keyboard device further comprises a switch circuit board, which is located under the key structure and contacted with the linking bar part, wherein when the switch circuit board is triggered by the key structure, a key signal is generated, wherein the key structure further comprises an elastic element between the keycap and the switch circuit board, wherein when the elastic element is pushed by the keycap, the switch circuit board is triggered by the elastic element, wherein when the elastic element is not pushed by the keycap, the keycap is returned to an original position in response to an elastic force of the elastic element.

7. The keyboard device according to claim 6, wherein the switch circuit board comprises:
   a first opening aligned with the first connecting element and located under the first connecting element, wherein a portion of the base plate is penetrated through the first opening and connected with the first connecting element; and
   a second opening aligned with the second connecting element and located under the second connecting element, wherein another portion of the base plate is penetrated through the second opening and connected with the second connecting element.

8. The keyboard device according to claim 7, wherein the base plate comprises:
   a first base hook aligned with the first connecting element, wherein the first base hook is protruded from the base plate and penetrated through the first opening, and the first base hook is connected with a second coupling part of the first connecting element; and
   a second base hook aligned with the second connecting element, wherein the second base hook is protruded from the base plate and penetrated through the second opening, and the second base hook is connected with a fourth coupling part of the second connecting element.

9. The keyboard device according to claim 1, wherein the keycap comprises:
   a first keycap hook aligned with the first connecting element, and protruded from an inner surface of the keycap, wherein the first keycap hook is connected with a first coupling part of the first connecting element; and
   a second keycap hook aligned with the second connecting element, and protruded from the inner surface of the keycap, wherein the second keycap hook is connected with a third coupling part of the second connecting element.

* * * * *